Patented Jan. 2, 1951

2,536,521

UNITED STATES PATENT OFFICE 2,536,521

2,5-DIAMINO-1-THIADIAZINE-3,4 AND DERIVATIVES THEREOF

Henry A. Walter, Longmeadow, Mass., assignor to Monsanto Chemical Company, St. Louis, Mo., a corporation of Delaware No Drawing. Application November 24, 1948,
Serial No. 61,915

3 Claims. (Cl. 260—243)

This invention relates to diazines and resins made therefrom. More particularly, the invention relates to 2,5-diamino-1-thiadiazine-3,4 derivatives thereof and resins prepared therefrom.

An object of this invention is to provide 2,5-diamino-1-thiadiazine-3,4.

A further object is to provide derivatives of 2,5-diamino-1-thiadiazine-3,4.

Another object is to provide thermosetting resins based on 2,5-diamino-1-thiadiazine-3,4 and its derivatives.

These and other objects are attained by reacting thiosemicarbazide with chloracetamide or an alkyl substituted chloracetamide and then reacting the product with an aldehyde.

The following examples are given in illustration and are not intended as limitations of the scope of this invention. Where parts are mentioned, they are parts by weight.

Example I

A mixture of 100 parts of thiosemicarbazide and 86 parts of chloracetamide was dissolved in a 50-50 solution of ethanol in water. Reaction was rapid at a temperature of about 70° C. and a precipitate was formed. The precipitate was recovered by filtration and was then treated with hot aqueous sodium bicarbonate. On cooling, a crystalline product in the shape of fine needles was obtained. The crystals had a melting point of over 250° C. The crystals were identified as 2,5-diamino-1-thiadiazine-3,4.

Example II

A solution of 100 parts of thiosemicarbazide in aqueous ethanol was mixed with a solution of 100 parts of α-chloropropionamide in aqueous ethanol. On mixing the two solutions, rapid reaction was observed and a precipitate developed. The precipitate was recovered by filtration and dissolved in hot aqueous sodium bicarbonate. On cooling, fine needle-like crystals developed which were identified as 2,5-diamino-6-methyl-1-thiadiazine-3,4.

The compounds of this invention have the following structural formula

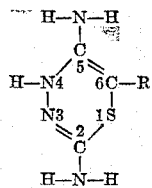

wherein R may be hydrogen, alkyl or aryl.

They are prepared by reacting thiosemicarbazide with a compound having the formula R—CHCl—CONH₂ wherein R may be hydrogen, alkyl or aryl. Thus, when R is hydrogen, the compound is chloracetamide, when R is methyl the compound is α-chloropropionamide, when R is phenyl the compound is α-phenyl, α-chloracetamide. The compounds may be named from the acid from which they are derived or as substitution products of acetamide. Thus, α-chloropropionamide may also be called α-methyl-α-chloracetamide and α-phenyl-α-chloracetamide may be called α-chlorobenzamide. It is preferred to use approximately equimolar quantities of the two reactants since a large excess of either component tends to produce undesirable by-products in substantial amounts.

The reaction between thiosemicarbazide and the chloracetamides may be easily carried out at temperatures ranging from 50–100° C. although higher temperatures may be used if desired. The reaction is conveniently carried out in ethanol-water solutions, especially since the products are insoluble therein and may be easily recovered by a simple filtration process. The precipitate must then be treated with hot sodium bicarbonate to obtain the free base. Other compounds than sodium bicarbonate may be used including sodium hydroxide, sodium carbonate, potassium carbonate, etc.

The compounds of this invention are particularly useful for the preparation of thermosetting molding powders and coating resins. The resins are prepared by reacting the thiadiazines with aldehydes, especially formaldehyde under alkaline conditions with or without further modification with an alcohol.

Example III

A mixture of 1 mol of 2,5-diamino-1-thiadiazine-3,4 with 2 mols of formaldehyde was heated at reflux temperature and atmospheric pressure at a pH of about 8-9 for about 1 hour. The product was an aqueous suspension of a light brown, fusible resin. The resin could be recovered by dehydration and molded with or without conventional additives such as fillers, pigments, dyes, lubricants, etc. The resin could be cured to the infusible state by heating at from 100–200° C. The time necessary to effect a complete cure could be shortened by the use of acidic curing catalysts.

If it is desired to prepare a coating resin, the thiadiazines may be reacted with an aldehyde and an alcohol. Any alcohol may be used such as methanol, ethanol, butanol, stearyl alcohol, cetyl alcohol, benzyl alcohol, cyclohexanol, etc. All three ingredients may be reacted together at one time under alkaline conditions, or the thiadiazine and aldehyde may be reacted together under alkaline conditions, and the product reacted with the alcohol under acid conditions.

The alcohol-modified resins are compatible with other coating resins such as alkyd resins and the coatings made therefrom have a high gloss, excellent alkali-resistance and excellent resistance to aging.

The resinous condensation products of this invention are further described and claimed in my continuation-in-part application Serial No. 120,420, filed October 8, 1949.

It is obvious that many variations may be made in the products and processes of this invention without departing from the spirit and scope thereof as defined by the appended claims.

What is claimed is:

1. A compound corresponding to the formula

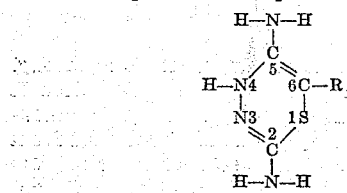

wherein R is a radical taken from the group consisting of hydrogen, methyl and phenyl radicals.

2. 2,5-diamino-1-thiadazine-3,4.
3. 2,5-diamino-6-methyl-1-thiadiazine-3,4.

HENRY A. WALTER.

REFERENCES CITED

The following references are of record in the file of this patent:

UNITED STATES PATENTS

| Number | Name | Date |
|---|---|---|
| 2,449,520 | Walter | Sept. 14, 1948 |
| 2,454,262 | Walter | Nov. 16, 1948 |

OTHER REFERENCES

Bose: Chem. Abstr., vol. 20 (1926).
Bose: Chem. Abstr., vol. 21 (1927).